United States Patent
Mansfeld et al.

(10) Patent No.: US 6,632,294 B2
(45) Date of Patent: Oct. 14, 2003

(54) CORROSION PROTECTION OF STEEL IN AMMONIA/WATER HEAT PUMPS

(75) Inventors: Florian B. Mansfeld, Marina del Rey, CA (US); Zhaoli Sun, Los Angeles, CA (US)

(73) Assignee: Advanced Mechanical Technology, Inc., Watertown, MA (US)

(*) Notice: Subject to any disclaimer, the term of this patent is extended or adjusted under 35 U.S.C. 154(b) by 101 days.

(21) Appl. No.: 09/774,540

(22) Filed: Jan. 31, 2001

(65) Prior Publication Data

US 2002/0043649 A1 Apr. 18, 2002

Related U.S. Application Data

(63) Continuation-in-part of application No. 09/764,740, filed on Sep. 29, 2000, now abandoned, which is a continuation of application No. 09/494,894, filed on Jan. 31, 2000, now abandoned, which is a continuation-in-part of application No. 09/422,201, filed on Oct. 19, 1999, now abandoned.

(30) Foreign Application Priority Data

Oct. 19, 2000 (WO) .................................. PCT/US00/41325

(51) Int. Cl.[7] .................... C23C 22/00; C23C 22/83; C23F 11/04; C23F 11/06; C09K 5/00
(52) U.S. Cl. .................... 148/272; 252/68; 148/273; 148/320; 62/85; 62/324.1; 422/12; 422/13; 428/469

(56) References Cited

U.S. PATENT DOCUMENTS

| | | | |
|---|---|---|---|
| 4,039,023 A | 8/1977 | McClaine | 165/2 |
| 4,328,285 A | 5/1982 | Siemers et al. | 428/633 |
| 5,342,578 A | * 8/1994 | Agrawal et al. | 422/13 |
| 5,362,335 A | 11/1994 | Rungta | 148/272 |
| 5,372,638 A | 12/1994 | DePue et al. | 106/404 |
| 5,377,494 A | * 1/1995 | Takagi et al. | 62/102 |
| 5,384,214 A | 1/1995 | Sugihara et al. | 429/206 |
| 5,547,600 A | * 8/1996 | Downey | 252/68 |
| 5,811,026 A | 9/1998 | Phillips et al. | 252/74 |
| 6,120,619 A | * 9/2000 | Goudiakas et al. | 148/271 |

FOREIGN PATENT DOCUMENTS

| | | | |
|---|---|---|---|
| JP | 309879 A | * 11/2000 | |
| WO | WO 96/11290 | 4/1996 | C23C/22/48 |

OTHER PUBLICATIONS

Hinton, B.R.W., "Corrosion inhibition with rare earth metal salts," *Journal of Alloys and Compounds*, 180:15–25 (1992).

Patent Abstracts of Japan, 008(182):(M–319) (1984) (publication no. 59074492).

Breslin, C.B., et al., "The Electrochemical Behavior of Stainless Steels Following Surface Modification in Cerium–Containing Solutions," *Corrosion Science* 39(6):1061–1073 (1997).

Mansfeld, F., et al., "Sealing of Anodized Aluminum Alloys with Rare Earth Metal Salt Solutions," *J. Electrochem, Soc.*, 145(8):2792–2798 (1998).

Mansfeld, F., et al., "Sealing of Anodized Aluminum Alloys with Rare Earth Metal Salt Solutions," *Electrochemical Society Proceedings*, 97–26:602–620.

* cited by examiner

*Primary Examiner*—Matthew A. Thexton
(74) *Attorney, Agent, or Firm*—Hamilton, Brook, Smith & Reynolds, P.C.

(57) ABSTRACT

Corrosion of steel surfaces in a heat pump is inhibited by adding a rare earth metal salt to the heat pump's ammonia/water working fluid. In preferred embodiments, the rare earth metal salt includes cerium, and the steel surfaces are cerated to enhance the corrosion-inhibiting effects.

25 Claims, 5 Drawing Sheets

CORROSION PROTECTION OF STEEL IN AMMONIA/WATER HEAT PUMPS

RELATED APPLICATIONS

This application is a Continuation-in-part of copending U.S. Application No. 09/764,740, filed Sep. 29, 2000, now abandoned, which is a Continuation of copending U.S. Application No. 09/494,894, filed Jan. 31, 2000, now abandoned, which is a Continuation-in-Part of copending U.S. application Ser. No. 09/422,201, filed Oct. 19, 1999, now abandoned. The entire teachings of all of the above applications are incorporated herein by reference.

GOVERNMENT SUPPORT

The invention was supported, in whole or in part, by a grant, Contract No. DE-FG02-98-ER82519, from the Department of Energy. The Government has certain rights in the invention.

BACKGROUND OF THE INVENTION

Absorption heat pumps, chillers, refrigerators and air conditioners (hereafter, collectively referred to as "heat pumps") use an ammonia/water working fluid, as well as other types, to transfer heat. Absorption heat pumps offer high heating and cooling efficiencies without the use of refrigerants that are harmful to the environment. The structure and functioning of an absorption heat pump are further described in U.S. Pat. No. 5,811,026, which is herein incorporated by reference in its entirety.

To compete effectively in the marketplace, advanced absorption systems, such as the Generator-Absorber heat exchange (GAX) cycle heat pump, utilize low-cost materials of construction such as carbon steel, which lacks the corrosion resistance of more-costly alloys, such as stainless steel. The use of steel, especially mild steel, is advantageous because steel is easily formed and welded. Nevertheless, steel can be corroded by the highly-corrosive ammonia/water solution at the elevated temperatures typically required for highly-efficient thermodynamic cycles. Corrosion of the steel produces magnetite ($Fe_3O_4$) and hydrogen gas ($H_2$) according to the following reaction:

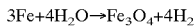

$$3Fe+4H_2O \rightarrow Fe_3O_4+4H_2$$

The magnetite coatings formed on the steel surface at elevated temperatures can become thicker with time, flake off and clog the tubes of the heat pump, while the formation of hydrogen and other non-condensible gases reduce the efficiency of the system. The formation of magnetite by a corrosion reaction decreases the structural integrity of pressure-retaining components of the heat pump. The loss of structural integrity is of particular concern in the high pressure components of the system, such as the desorber and condenser which operate at pressures as high as 300 psig to 450 psig.

Conventionally, a chemical inhibitor in the form of sodium chromate ($Na_2CrO_4$) or sodium dichromate ($Na_2Cr_2O_7$) is added to the working fluid to inhibit the working fluid from reacting with the steel. Sodium chromate is effective for operating temperatures up to about 200° C., which is 10° C. or more below the typical peak solution temperature in the GAX cycle. It has been shown that sodium chromate ($Na_2CrO_4$) can react with ammonia at high temperatures to form $N_2$ and NaOH according to the following reaction:

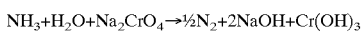

$$NH_3+H_2O+Na_2CrO_4 \rightarrow \tfrac{1}{2}N_2+2NaOH+Cr(OH)_3$$

In this reaction, the chromium ion is reduced from a plus-6 to a plus-3 state. In the absence of an inhibitor, a much larger quantity of non-condensible gas, primarily hydrogen, is formed than in chromate-inhibited systems. Nitrogen gas is the primary non-condensible gas formed in chromate-inhibited systems. In chromate-inhibited systems, the rates of magnetite scale formation and chromate breakdown increase with increasing temperature. Further, the addition of chromate inhibitors imposes significant disadvantages due to the fact that chromium is highly toxic, having been identified as a human carcinogen by the International Agency for Research on Cancer. In addition, chromium pollutants present substantial environmental hazards. As a result, their use is being phased out in many localities.

SUMMARY OF THE INVENTION

Applicants have found that rare earth metal salts can be substituted for chromates as chemical inhibitors in ammonia/water heat pumps avoiding the health and environmental risks, reactivity and temperature limitations of sodium chromates.

A method of Applicants' invention includes the step of introducing a rare earth metal salt to the ammonia/water working fluid in a heat pump to inhibit corrosion of the heat pump's steel surfaces. The rare earth metal salt can be a cerium salt of the cerous salt form, preferably, cerium nitrate. The concentration of the rare earth metal salt can be about 10 mM to about 350 mM. Preferred embodiments of the method of this invention include a dual protection method of pre-treating the steel surface with a cerium oxide/hydroxide layer to prevent both corrosion of the metal and ammonia dissociation, and adding rare earth metal salts to the solution to act as a corrosion inhibitor. In addition to acting as a corrosion protective layer, the cerated coating insulates the metal surface, preventing electrochemical reactions, which can result in generation of non-condensible gases.

An apparatus of this invention includes a heat pump having a steel housing and an ammonia/water working fluid contained in the steel housing. In preferred embodiments, the heat pump's corrosion resistance is enhanced by cerating the steel surfaces that will be exposed to the ammonia/water working fluid.

The methods and apparatus of this invention offer a number of advantages. For example, the use of a rare earth metal salt, such as cerium nitrate, provides a degree of corrosion inhibition similar to that of $Cr^{6+}$ without incurring the health and environmental risks that are posed by chromates. Further, the use of a rare earth metal salt in accordance with this invention also reduces the amount of non-condensible gas generated in the heat pump. Further still, a smaller quantity of cerium nitrate appears to be required to match the inhibition performance of chromates, therefore providing a potential for cost savings, as well. Finally, cerium salts are very inexpensive.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. As used herein, the term, "rare earth metal," includes elements with atomic number 21, 39 and 57–71.

Figure 1:
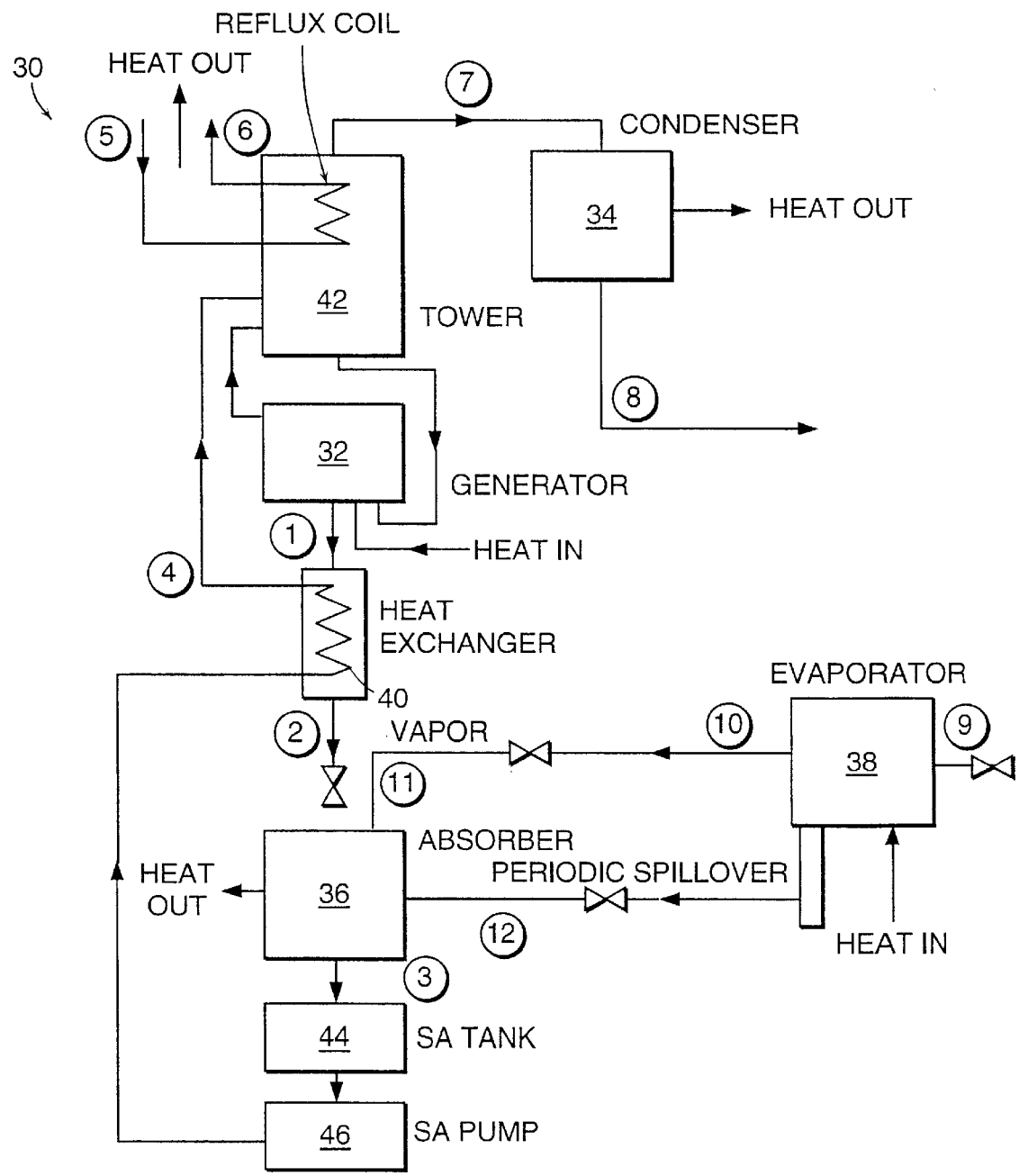
FIG. 1 is a schematic drawing of an ammonia/water single-stage absorption system.

As described above and as illustrated in FIG. 1, an absorption system 30 generally includes a desorber (also known as a vapor generator) 32, condenser 34, absorber 36, evaporator 38, heat exchanger 40, tower 42, SA tank 44, SA pump 46 and other components contained in a steel housing. The steel housing is preferably formed of a low-carbon/mild steel, though corrosion problems can also be found where stainless steel and chrome-plated steel are used. Corrosion and dissociation most commonly occur in the highest temperature regions of the system, such as the desorber, where the working fluid comprises 5 to 20 weight-percent ammonia in water. The working fluid may also include 0.2 weight-percent sodium hydroxide (NaOH) for pH control. During operation, the working fluid is maintained under anaerobic conditions at temperatures up to about 220° C.

The working fluid of this invention additionally includes a corrosion inhibitor in the form of a rare earth metal salt (REMS), such as cerium nitrate, cerium chloride, yttrium salts (particularly, yttrium sulfate), and other rare earth metal chlorides, nitrates and sulfates. Preferred rare earth metal salts have low toxicity and are environmentally friendly, and above all, effective in reducing corrosion to acceptable levels.

In further preferred embodiments, corrosion of the steel surfaces is further inhibited by subjecting the steel to a pretreatment process, known as "cerating." The steel surfaces are cerated by exposing the steel to a solution of about 12.5 g/l cerium chloride ($CeCl_3$) and about 1 to 2.5 weight-percent hydrogen peroxide ($H_2O_2$) at room temperature for about 20 minutes. As a result of this exposure, a thick cerium oxide/hydroxide layer having a "cracked-mud" appearance is formed on the steel. The term, "thick," as used in this context, indicates that the layer has a thickness significantly greater than a monolayer or molecular scale. Rather, a "thick" coating of this invention will generally have a thickness on the order of microns. Cracks in the cerated surface can be sealed by subsequently immersing the steel in a boiling REMS solution (e.g., a cerium nitrate or other cerium salt solution) or by cathodic polarization at a constant current density in a REMS solution. It has been observed that the cracks become sealed after a few days immersion in the hot ammonia/water working fluid that includes a REMS such as a cerium salt. Accordingly, the combination of cerating along with the addition of a REMS to the working fluid produces the unique advantage of providing a protective cerated coating having voids that are sealed when the heat pump is put into operation, thereby forming a relatively impermeable coating. Thinner surface layers with finer cracks have been obtained by the addition of compounds such as lead acetate and a wetting agent to the cerating solution. Protection of the steel surfaces can be improved by the use of the optimized cerating process in which sealing of these layers is performed by immersion in a silicate solution (e.g. 10% $Na_2SiO_3 9H_3O$) at 50° C. for 30 minutes. The combination of cerating the steel along with the use of a REMS inhibitor in the working fluid therefore affords a protective effect unattainable with either of these two methods alone.

Prior to cerating, the steel surface preferably is prepared by degreasing it in an ALCONOX detergent solution (Alconox, Inc., New York, N.Y.) and polishing with sand paper to at least grit 240. The steel surface is then pickled in a volume ratio 1:1 $HCl:H_2O$ solution for about 30 seconds. The steel surface is rinsed throughly with deionized water between and/or after these procedures. The final step is air drying the steel surface at room temperature.

EXPERIMENTAL

Figure 3A:
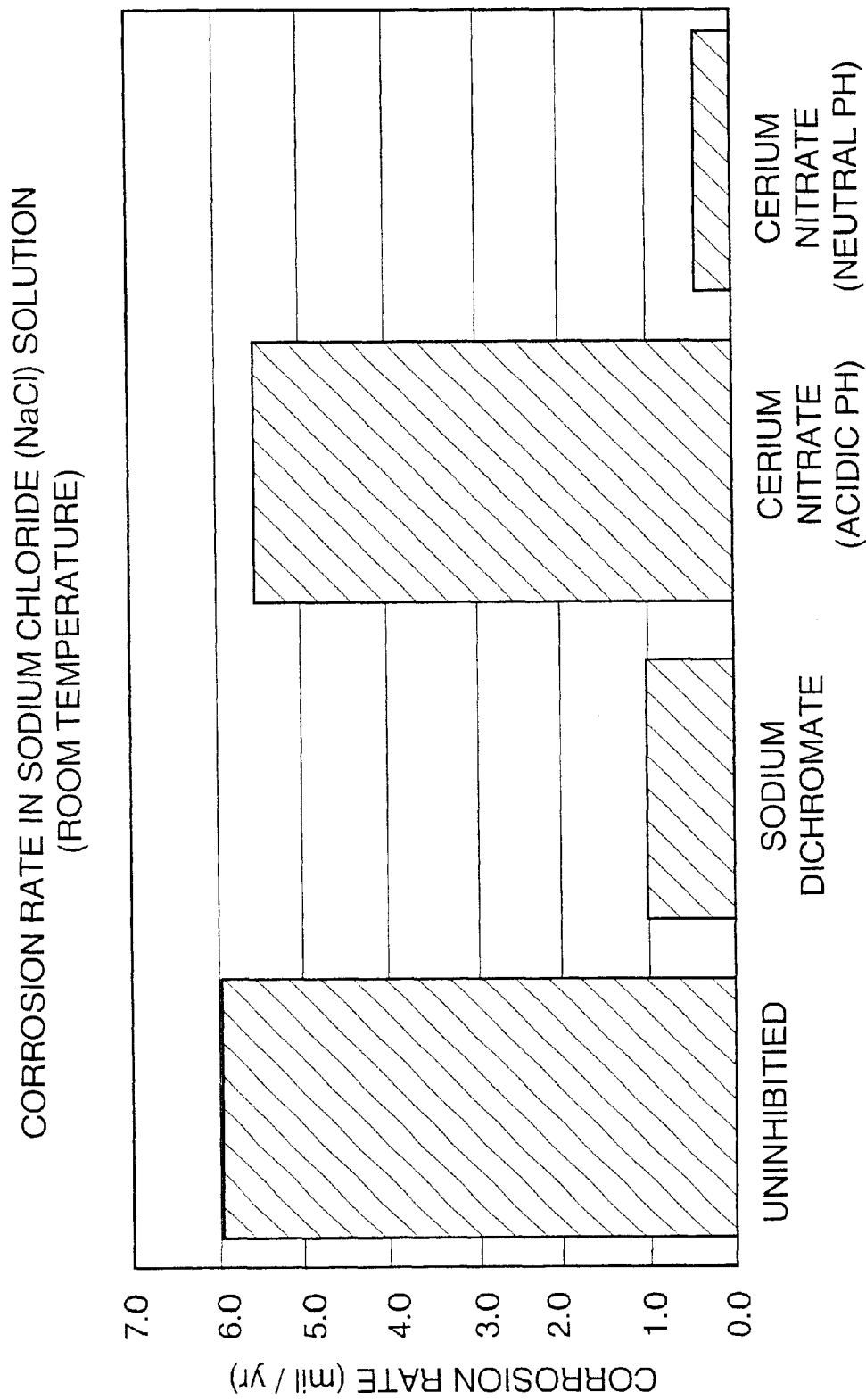
FIG. 3A is a chart illustrating the measured corrosion rate of steel in sodium chloride solution at room temperature without inhibitor and with sodium dichromate and cerium nitrate inhibitors.

In initial screening tests, cerium nitrate ($Ce(NO_3)_3$) was evaluated as a corrosion inhibitor at room temperature and at 100° C. As shown in FIG. 3A, cerium nitrate proved to be less effective than the standard sodium dichromate inhibitor for inhibiting corrosion of steel in a very-aggressive aerated NaCl solution. In FIG. 3A, the "acidic" cerium nitrate solution represented the natural pH of a cerium nitrate solution (pH=2.5). The second cerium nitrate solution was neutralized to a pH of 7.0.

Figure 3B:
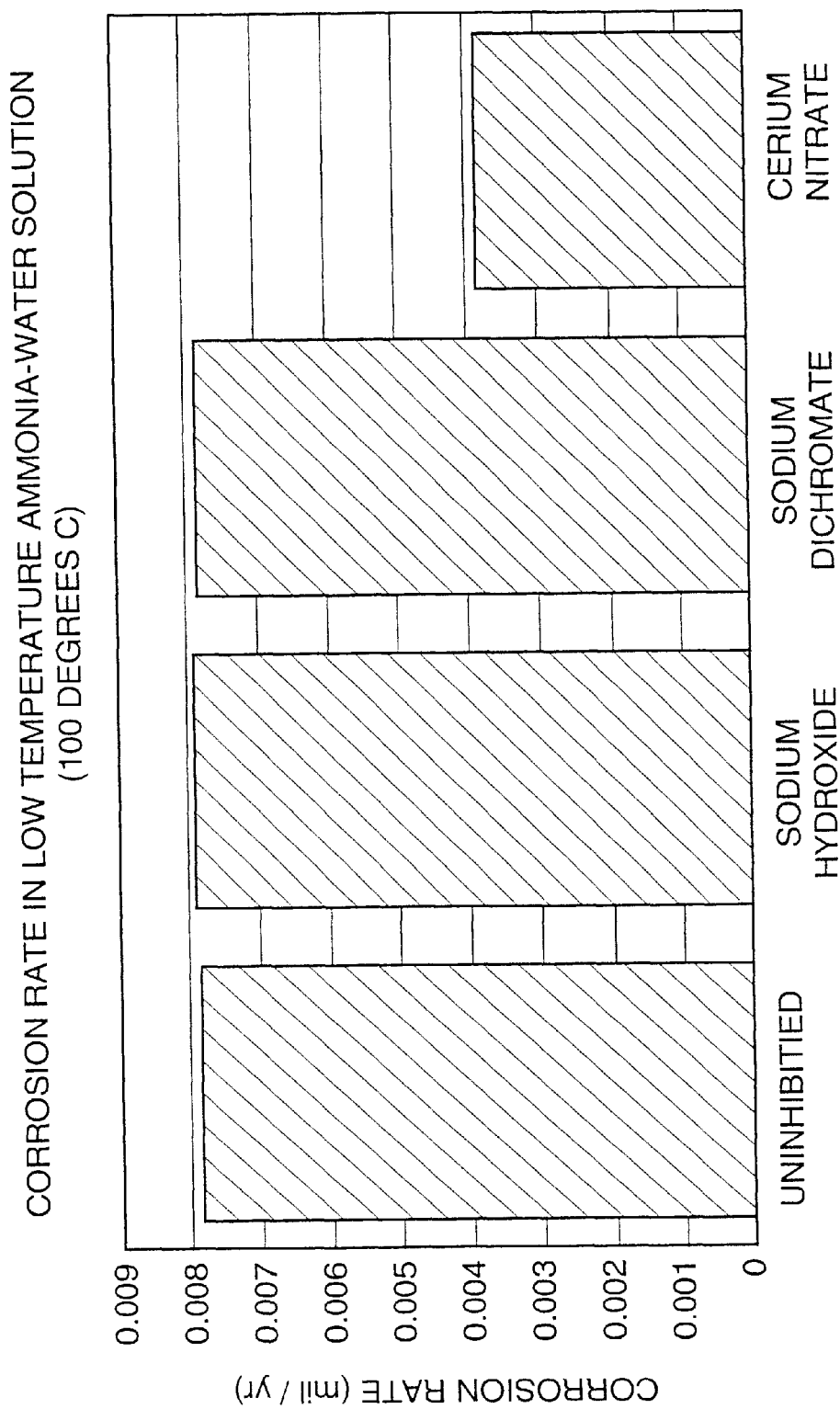
FIG. 3B is a chart illustrating the measured corrosion rate of steel in ammonia/water solution at 100° C. without inhibitor and with sodium dichromate and cerium nitrate inhibitors.

Nevertheless, as shown in FIG. 3B, the performance of cerium nitrate as a corrosion inhibitor at 100° C. in ammonia/water solutions was comparable to or better than that of sodium dichromate. The sodium-dichromate and cerium-nitrate inhibited solutions of FIG. 3B also contained sodium hydroxide in the same concentration as in the sodium-hydroxide inhibited solution.

Additional testing was performed in a high-temperature test apparatus, which, for a given system pressure, provided a range of temperatures, ammonia concentrations, and phases which spanned the conditions found in the high temperature components of the ammonia-water absorption system. A system schematic is shown in FIG. 2.

Figure 2:
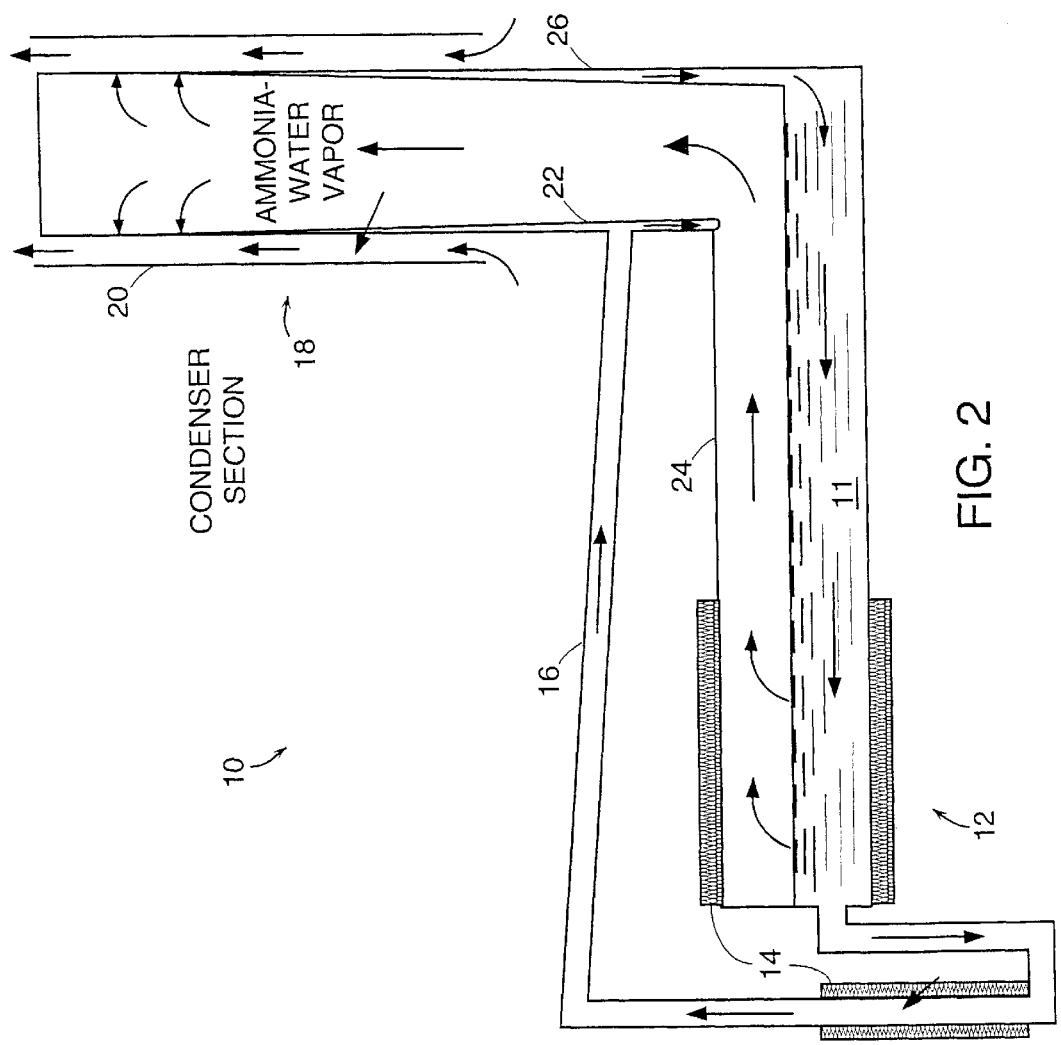
FIG. 2 is a cross-sectional illustration of a test apparatus used to test the methods of this invention.

As shown in FIG. 2, the test apparatus 10 included housing formed of two one-inch nominal carbon steel pipes 24, 26, each capped at one end and connected by a 90° elbow; an ammonia/water solution 11 filling the horizontal pipe 24 about to its centerline; a vapor generator section 12; electric resistance heaters 14 for heating the solution, boiling off ammonia and some water; a recirculation loop 16; and a condenser section 18 including a cooling jacket 20 through which cool ambient air was drawn to condense vaporized solution in the form of a falling liquid film 22 on the wall of the vertical pipe 26. Accordingly, the apparatus 10 offered the opportunity to monitor corrosion under conditions similar to those found in working ammonia-water absorption systems.

In a typical test with a system pressure of between 350 and 400 psig, the system temperature ranged from about 450° F. at the heated end of the vapor generator section to about 400° F. at the elbow and about 180° F. at the upper end of the condenser section. Ammonia concentrations in the solution ranged from about 3% or 4% at the heated end to about 7% to 10% at the elbow. In the vapor phase, ammonia concentrations ranged from about 10% to 12% at the heated end of the generator to about 35% at the elbow and 99% plus at the upper end of the condenser section.

Figure 3C:
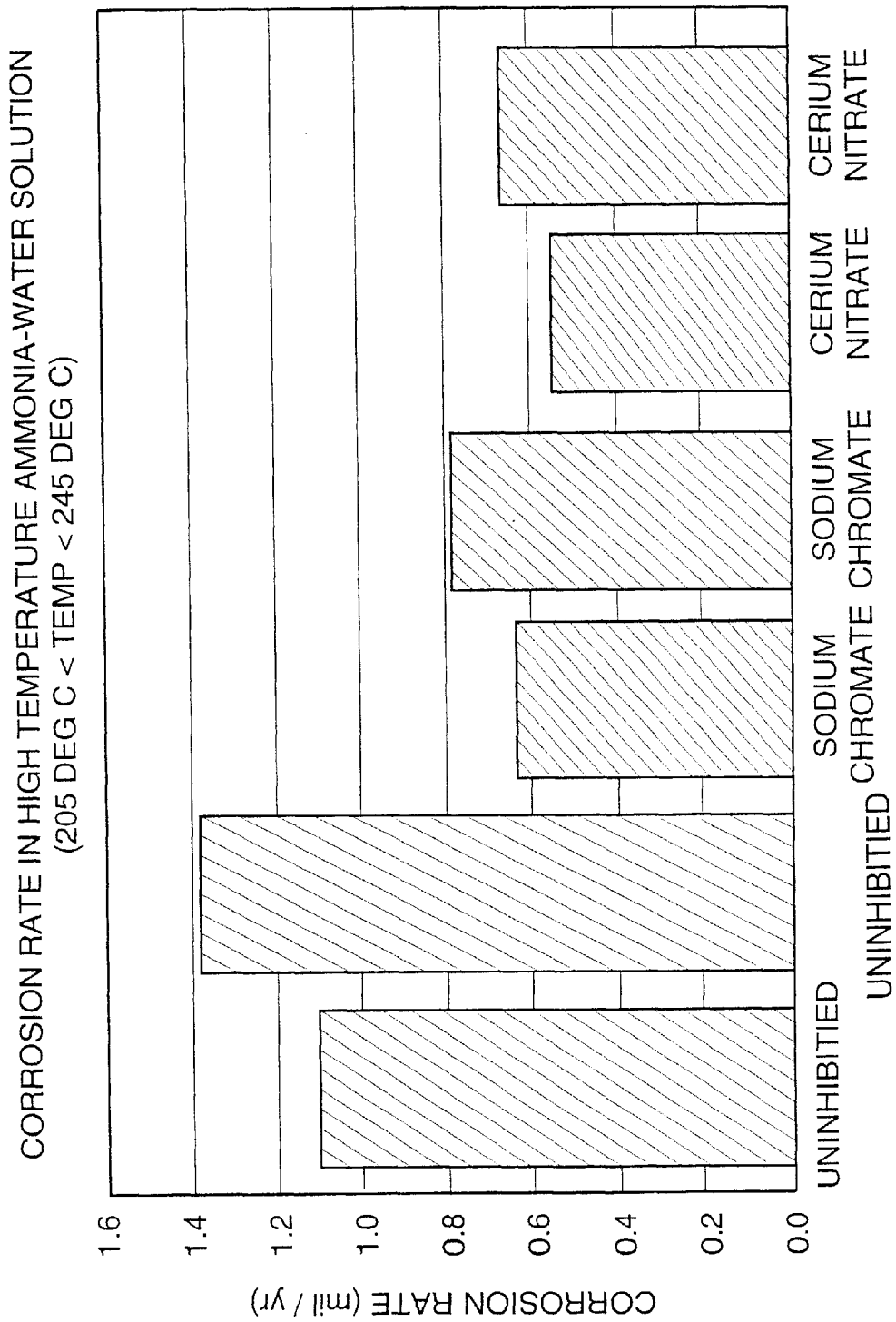
FIG. 3C is a chart illustrating the measured corrosion rate of steel in ammonia/water solution at a temperature between about 205° C. and about 245° C. without inhibitor and with sodium chromate and cerium nitrate inhibitors.

As shown in FIG. 3C, high-temperature testing under simulated ammonia-water absorption system conditions further demonstrated the effectiveness of cerium nitrate as a corrosion inhibitor. The two bars for each case (uninhibited, sodium chromate, cerium nitrate) represent readings from different corrosion probes in apparatus 10 after 48 hours of operation. As FIG. 3C illustrates, the corrosion rates of steel in a cerium-nitrate inhibited solution were significantly less than those in an uninhibited solution, and comparable to that in a sodium-chromate inhibited solution.

As evidenced by the preceding data, this non-toxic cerium compound has shown the potential to match or exceed the corrosion inhibiting properties of sodium chromate and dichromate. In addition to the advantage of non-toxicity, it appears that a smaller quantity of cerium nitrate can match the inhibition performance of the chromates, suggesting the potential for cost savings as well. Room-temperature and 100° C. testing also demonstrated the corrosion protection potential of a steel surface pretreatment process whereby protective cerium oxides/hydroxides were formed in a simple room-temperature immersion process.

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for inhibiting corrosion of steel in an ammonia/water heat pump, comprising:
   cerating steel surfaces that will be exposed to an ammonia/water working fluid; and
   introducing a rare earth metal salt to an ammonia/water working fluid in a heat pump having steel surfaces exposed to the working fluid, wherein the rare earth metal includes yttrium.

2. The method of claim 1, wherein the rare earth metal salt includes cerium.

3. The method of claim 1, wherein the rare earth metal comprises cerous nitrate.

4. The method of claim 3, wherein the concentration of rare earth metal salt in the ammonia/water working fluid is between about 5 mM and about 350 mM.

5. The method of claim 1, wherein the rare earth metal salt includes cerium sulfate.

6. The method of claim 5, wherein the concentration of rare earth metal salt in the ammonia/water working fluid is between about 5 mM and about 350 mm.

7. The method of claim 1, wherein the rare earth metal salt includes yttrium sulfate.

8. The method of claim 7, wherein the concentration of rare earth metal salt in the ammonia/water working fluid is between about 5 mM and about 350 mM.

9. The method of claim 1, wherein the steel surfaces are cerated by exposing the steel surfaces to a cerium chloride solution including about 1 to 2.5 weight-percent hydrogen peroxide at about room temperature for about 20 minutes.

10. The method of claim 9, wherein the solution includes lead acetate and a wetting agent.

11. The method of claim 9, further comprising the step of sealing the cerated surfaces by exposing the surfaces to a silicate solution at about 50° C. for about 30 minutes.

12. The method of claim 11, wherein the silicate solution is about 10% sodium meta-silicate.

13. The method of claim 1, further comprising the step of sealing cracks in the cerated surface by immersing the cerated seal in a boiling REMS solution.

14. The method of claim 13, wherein the boiling REMS solution is a cerous nitrate solution.

15. The method of claim 14, wherein the boiling REMS solution is a cerium nitrate solution.

16. The method of claim 14, wherein the boiling REMS solution is a cerium sulfate solution.

17. The method of claim 13, wherein the boiling REMS solution also contains ammonia.

18. The method of claim 13, wherein the boiling REMS solution is a yttrium salt solution.

19. The method of claim 18, wherein the boiling REMS solution is a yttrium sulfate solution.

20. A method of inhibiting both corrosion of steel surfaces and dissociation of ammonia in a heat pump having an ammonia/water working fluid comprising:
   insulating the steel surfaces with a cerated layer; and
   introducing a rare earth metal salt to the working fluid.

21. A corrosion-resistant heat pump comprising:
   a steel housing wherein the steel housing is coated with a yttrium compound; and
   an ammonia/water working fluid contained in the steel housing, the ammonia water/working fluid including a rare earth metal salt, wherein the rare earth metal salt includes yttrium.

22. The corrosion-resistant heat pump of claim 21, wherein the rare earth metal salt includes cerium.

23. The corrosion-resistant heat pump of claim 22, wherein the steel housing is coated with a cerium compound.

24. The corrosion-resistant heat pump of claim 22, wherein the concentration of rare earth metal salt in the ammonia/water working fluid is between about 5 mM and about 350 mM.

25. The corrosion-resistant heat pump of claim 21, wherein the concentration of rare earth metal salt in the ammonia/water working fluid is between about 5 mM and about 350 mM.

* * * * *